United States Patent
Bacon

(10) Patent No.: US 7,407,133 B2
(45) Date of Patent: Aug. 5, 2008

(54) USING IMBALANCED THRUST IN A MULTI-ENGINE JET AIRCRAFT

(75) Inventor: Richard J. Bacon, Golden, CO (US)

(73) Assignee: 3x Jet Aircraft Company, Golden, CO (US)

(*) Notice: Subject to any disclaimer, the term of this patent is extended or adjusted under 35 U.S.C. 154(b) by 88 days.

(21) Appl. No.: 11/077,248

(22) Filed: Mar. 9, 2005

(65) Prior Publication Data
US 2005/0178890 A1 Aug. 18, 2005

Related U.S. Application Data

(62) Division of application No. 09/912,078, filed on Jul. 24, 2001, now Pat. No. 6,921,046.

(51) Int. Cl.
*B64D 27/16* (2006.01)
(52) U.S. Cl. ........................ 244/55; 244/53 R
(58) Field of Classification Search ............... 244/53 R, 244/54–61, 53 A, 53 B
See application file for complete search history.

(56) References Cited

U.S. PATENT DOCUMENTS

| | | | | |
|---|---|---|---|---|
| 2,557,522 A | * | 6/1951 | Vautier | 244/74 |
| 2,679,991 A | * | 6/1954 | Eagon | 244/74 |
| 2,694,357 A | * | 11/1954 | Lee | 454/76 |
| 2,934,288 A | * | 4/1960 | MacIntyre | 244/203 |
| 2,978,208 A | | 4/1961 | Halsmer | |
| 3,045,953 A | * | 7/1962 | Eggers et al. | 244/52 |
| 3,057,581 A | * | 10/1962 | Tumavicus | 244/52 |
| 3,060,685 A | * | 10/1962 | Tonnies et al. | 244/110 B |
| 3,075,728 A | * | 1/1963 | Kogan | 244/74 |
| 3,113,636 A | * | 12/1963 | Brown et al. | 181/220 |
| 3,224,712 A | * | 12/1965 | Maurice et al. | 244/53 B |
| 3,229,933 A | * | 1/1966 | Kutney | 244/55 |
| 3,352,514 A | * | 11/1967 | Addison | 244/56 |
| 3,366,350 A | * | 1/1968 | Fritz Hoffert et al. | 244/55 |
| 3,387,456 A | * | 6/1968 | Feder et al. | 60/204 |
| D220,981 S | * | 6/1971 | Ehrlich, Jr. | D12/334 |
| D220,982 S | * | 6/1971 | Ehrlich, Jr. | D12/334 |
| 3,614,034 A | * | 10/1971 | Townsend | 244/56 |
| 3,936,017 A | * | 2/1976 | Blythe et al. | 244/110 B |

(Continued)

OTHER PUBLICATIONS 1 (One) Color Photograph of an Airplane, British Airways, Airlines.Net.

(Continued)

*Primary Examiner*—Rob Swiatek
(74) *Attorney, Agent, or Firm*—Faegre & Benson, LLP

(57) ABSTRACT

Methods of operating a multi-engine jet-aircraft. According to one embodiment of the present invention, a first jet engine and a second jet engine are provided. One of the jet engines has a lesser maximum thrust capability than the other jet engine as a result of limiting the former's maximum thrust capability, but the two jet engines are otherwise equally powered. During various segments of flight, both the first jet engine and second jet engine are utilized. A thrust differential between the first jet engine and the second jet engine is created during one or more flight segments by continuing to run either the first jet engine or second jet engine, but running the other at a reduced power.

22 Claims, 5 Drawing Sheets

U.S. PATENT DOCUMENTS

| | | | | | |
|---|---|---|---|---|---|
| 4,478,378 | A | * | 10/1984 | Capuani | 244/12.5 |
| 4,500,052 | A | * | 2/1985 | Kim | 244/12.1 |
| 4,662,171 | A | * | 5/1987 | Jackson et al. | 60/39.15 |
| 4,667,900 | A | * | 5/1987 | Kim | 244/53 B |
| 4,711,415 | A | * | 12/1987 | Binden | 244/17.19 |
| 4,802,639 | A | * | 2/1989 | Hardy et al. | 244/2 |
| 4,805,396 | A | * | 2/1989 | Veerhusen et al. | 60/39.15 |
| 4,899,958 | A | * | 2/1990 | Horikawa | 244/53 B |
| 4,934,632 | A | * | 6/1990 | Kim | 244/53 R |
| 4,938,021 | A | * | 7/1990 | Jones et al. | 60/263 |
| 5,114,097 | A | * | 5/1992 | Williams | 244/119 |
| 5,170,964 | A | * | 12/1992 | Enderle et al. | 244/52 |
| 5,275,356 | A | * | 1/1994 | Bollinger et al. | 244/12.3 |
| 5,372,337 | A | * | 12/1994 | Kress et al. | 244/52 |
| 5,480,107 | A | * | 1/1996 | Bacon | 244/55 |
| 5,488,824 | A | * | 2/1996 | LeDoux et al. | 60/39.15 |
| 5,529,263 | A | * | 6/1996 | Rudolph | 244/55 |
| 5,855,340 | A | * | 1/1999 | Bacon | 244/53 R |
| 6,089,504 | A | * | 7/2000 | Williams et al. | 244/53 B |
| 6,170,780 | B1 | * | 1/2001 | Williams | 244/15 |
| 6,199,795 | B1 | * | 3/2001 | Williams | 244/15 |
| 6,247,668 | B1 | * | 6/2001 | Reysa et al. | 244/58 |
| 6,508,052 | B1 | * | 1/2003 | Snyder et al. | 60/39.092 |
| 6,612,522 | B1 | * | 9/2003 | Aldrin et al. | 244/2 |
| 6,921,046 | B2 | * | 7/2005 | Bacon | 244/52 |
| 6,990,798 | B2 | * | 1/2006 | Bouchard et al. | 60/269 |
| 2002/0074453 | A1 | * | 6/2002 | Bacon | 244/52 |
| 2003/0146344 | A1 | * | 8/2003 | Saito et al. | 244/55 |
| 2005/0178890 | A1 | * | 8/2005 | Bacon | 244/55 |

OTHER PUBLICATIONS

Author Unknown., "Hawker Siddeley Trident". 2 pages.
Author Unknown., "Hawker-Siddeley Trident- Definition of Hawker-Siddeley Trident in Ecyclopedia." http://encyclopedia.laborlawtalk.com/Hawker-Siddeley_Trident. 2005. p. 1-4.
Author Unknown., "Airline by Decade." Airline History. http://arilines.afriqonline.com/aircraft/bydecade/1960.htm. 2005. p. 1-29.
Author Unknown., "Flat Rating Concept" http://www.boeing-727.com/Data/Engine/Flat%20Rating.html. 2 Pages Mar. 16, 2003.
Ayers, Andrew, "The X-Plane Journal" Turbine Engines, C1998, http://member.newguy.com/-flight/xplane/html/turbines.html, 4 Pages.
Prouty, R.W., "Aerodynamics." Aviation Today, Jul. 1999 http://www.aviationtoday/com/reports/rotorwing/previous/july99/aerodynamics.htm, 2 Pages.

* cited by examiner ion Ser. No. 09/912,078, filed on Jul. 24, 2001 now U.S. Pat. No. 6,921,046.
USING IMBALANCED THRUST IN A MULTI-ENGINE JET AIRCRAFT

CROSS-REFERENCE TO RELATED APPLICATIONS

This patent application is a divisional of U.S. patent application Ser. No. 09/912,078, filed on Jul. 24, 2001 now U.S. Pat. No. 6,921,046.

This patent application is also related to the subject matter described in U.S. Pat. Nos. 5,855,340 and 5,480,107 of Richard J. Bacon (hereinafter the "prior patents"), both of which are commonly owned by the assignee and which are hereby incorporated by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2001-2005 3× Jet Aircraft Company.

STATEMENT REGARDING FEDERALLY SPONSORED RESEARCH OR DEVELOPMENT

Not applicable

THE NAMES OF PARTIES TO A JOINT RESEARCH AGREEMENT

Not applicable

INCORPORATION-BY-REFERENCE OF MATERIAL SUBMITTED ON A COMPACT DISC

Not applicable

SEQUENCE LISTING

Not applicable

BACKGROUND OF THE INVENTION

Various embodiments of the present invention generally relate to multi-engine jet aircraft configurations. More particularly, embodiments of the present invention relate to a centerline mounted unequal-thrust multi-engine configuration and operation thereof. Embodiments of the present invention are thought to have particular utility for use in the business jet industry.

BRIEF SUMMARY OF THE INVENTION

Methods of operating a multi-engine jet-aircraft are described. According to one embodiment of the present invention, a first jet engine and a second jet engine are provided. One of the jet engines has a lesser maximum thrust capability than the other jet engine as a result of limiting the former's maximum thrust capability, but the two jet engines are otherwise equally powered. During various segments of flight, both the first jet engine and second jet engine are utilized. A thrust differential between the first jet engine and the second jet engine is created during one or more flight segments by continuing to run either the first jet engine or second jet engine, but running the other at a reduced power.

A more complete understanding of the present invention may be derived by referring to the detailed description of preferred embodiments and claims when considered in connection with the figures.

BRIEF DESCRIPTION OF THE SEVERAL VIEWS OF THE DRAWING

In the FIGS., similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1A:
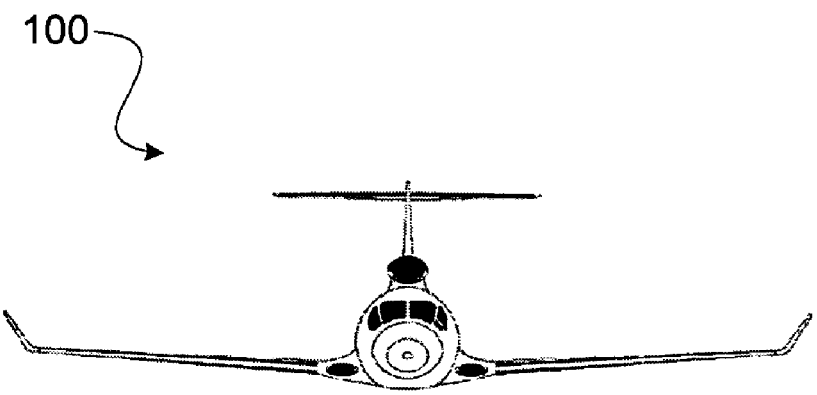
FIG. 1 illustrates various angles of a multi-engine jet aircraft configuration according to one embodiment of the present invention.
Figure 1B:
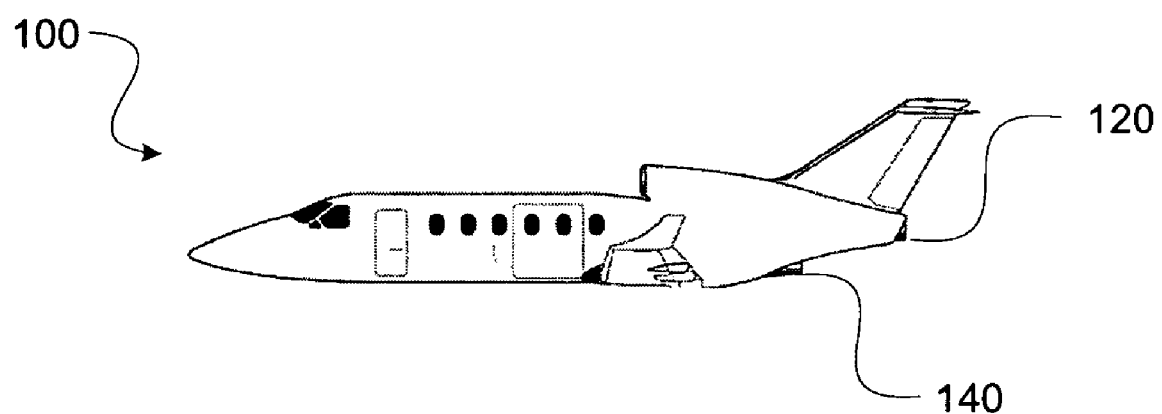
Figure 1C:
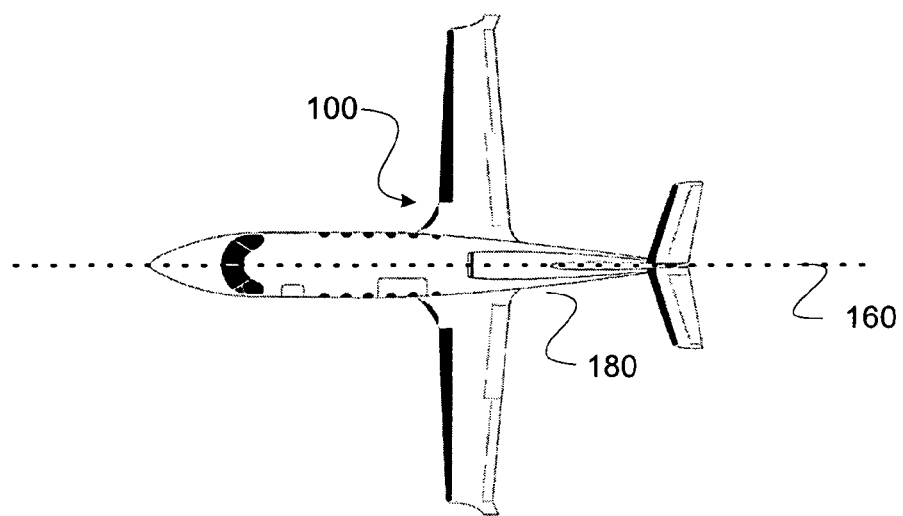
Figure 1D:
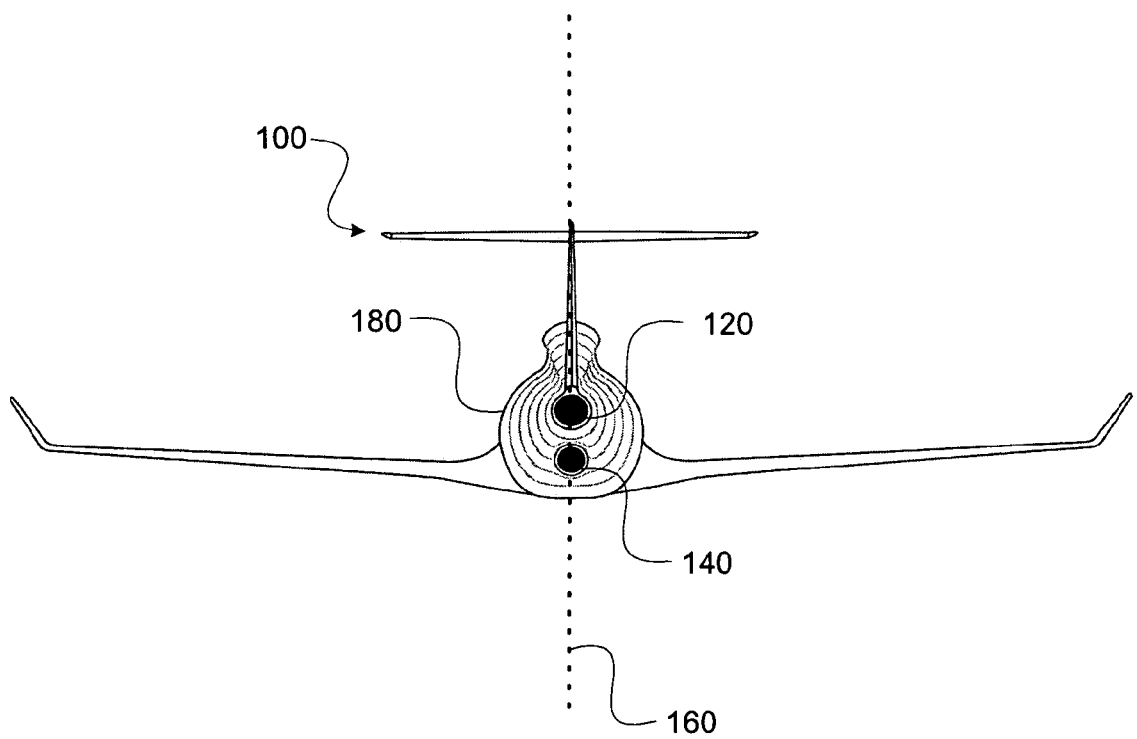
Figure 2A:
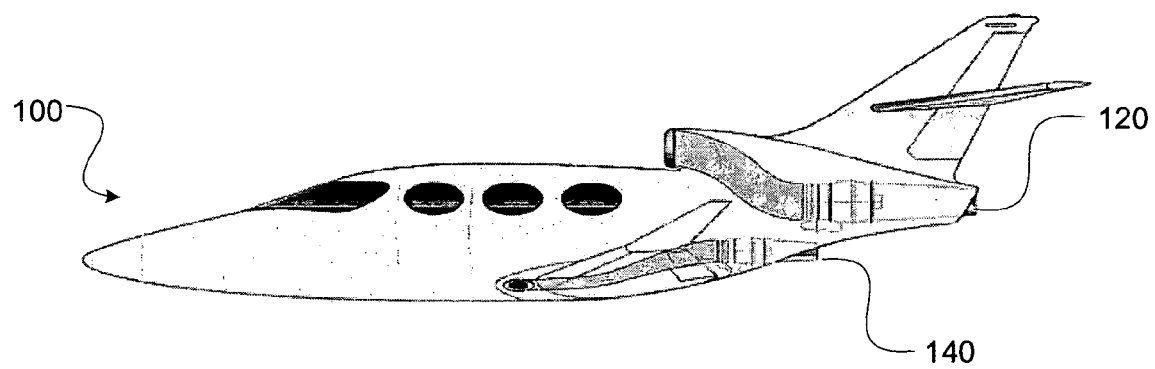
FIG. 2 illustrates airflow in accordance with various embodiments of multi-engine aircraft configurations.
Figure 2B:
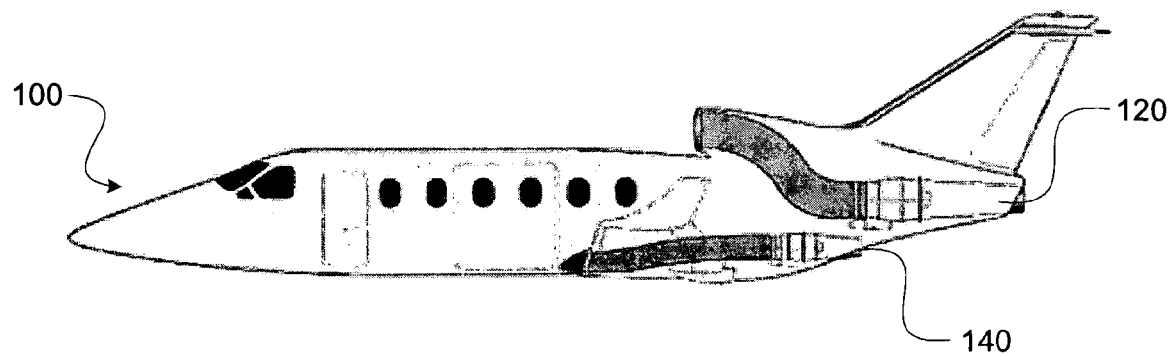

With reference to FIGS. 1A-2B, embodiments of the invention are illustrated for creating and using imbalanced thrust (e.g., differential power) in a centerline 160 mounted multi-engine 120, 140 jet aircraft 100. Embodiments of the present invention include: (a) a range of engine combinations, (b) a method of achieving or varying a thrust or power differential, (c) a range of operating methods, including sample profiles, (d) a number of particular applications, (e) improved design methods, and a number of other features and advantages, which are described below:

(a.) A Range of Engine Combinations.

Under the terminology of the prior patents, a 3× combination was discussed at some length. But surrounding the 3× range is a range produced by a wide variety of engine 120, 140 combinations. For example, a range of less than 2× to almost 4× (or beyond) may be employed. At the less-than-2× side, by focusing on the "cleaner" aerodynamics of the centerline 160 mounted concept, with less drag than a conventional twin, and other advantages it may be possible to have a thrust equivalent to that of a conventional (2×-powered) twin while using engines of less actual thrust than the twin—hence, a 1.6× (or even lower amount of combined thrust in a two-engine configuration) engine combination in accordance with embodiments the present invention could equal the effective thrust of a conventional twin, and result in a lower initial purchase cost (because of the anticipated reduced cost in engine acquisition corresponding with the reduced thrust of the engines) while preserving the lower operating costs and increased engine-out safety of the centerline mounted concept.

(b.) A Method of Achieving or Varying a Thrust Differential in Engines of the Same Size or Different Sizes.

As discussed further below with reference to FIG. 3, engine thrust differential may be achieved by various combinations of different engines 120, 140. It may also be achieved by combinations of the same engines or by engines that are otherwise equally powered but one engine's maximum thrust capability is limited in some manner.

One way of achieving a thrust differential from a pair of engines 120, 140 which are otherwise the same is by "down-rating" or otherwise reducing one of the engines from its maximum thrust. It may be possible to purchase two engines 120, 140 of identical maximum thrust potential, but down-rate one of them beneath its maximum thrust. Except for the down-rating, the engines 120, 140 are the same (resulting in common parts and common skills in the maintenance crew). Because of the down-rating, one of the engines (the down-rated one) may be less expensive than the other engine.

Even without down-rating, the benefits of a thrust differential could be achieved in a pair of centerline 160 mounted engines 120, 140 which are entirely identical if one of them is either shutdown (that is, "staged") during one or more flight segments, or is run at a different power setting than the other engine.

(c.) A Range of Operating Methods.

By "staging" is meant shutting off at least one of the engines 120, 140. As in the prior patents, the aircraft could be staged during taxi. But instead of staging during one or more of the flight segments (take-off, climb, cruise, descent and landing), both engines 120, 140 could be left running. Instead of staging during one or more of the flight segments, a thrust differential could be obtained by setting a pair of engines 120, 140 at different power settings, thereby creating an effective differential in thrust. This creation of differential thrust can be achieved without staging an engine, and it could even be achieved with identical engines. This leads to a wide range of operating profiles/operating methods.

A sample operational profile might be as follows:

TABLE 1

Sample Operational Profile

|  | Engine (1) | Engine (2) |
| --- | --- | --- |
| Taxi | off | operating |
| Takeoff & climb | operating | operating |
| Cruise & initial descent | operating | reduced power |
| Final descent & landing | operating | operating |
| Taxi | off | operating |

Where the paired engines 120, 140 are of different size, engine (1) in Table 1 above could be the larger of the two, and engine (2) in Table 1 above could be the smaller of the two. By turning off the larger engine on taxi, and reducing the power of the smaller engine while in cruise and initial descent, operating costs are reduced.

Embodiments of the present invention are not limited to the profile described in Table 1; rather it should be understood that there is a large range of profiles. The thrust differential concept employed by embodiments of the present invention permits the foregoing operational profile to be modified in every category to achieve whatever result is desired. For example, in the context of Table 1, engines 1 & 2 could be the same size; the engine off during taxi could be engine 2; the engine reduced during cruise could be engine 1 (or both engines might be reduced on cruise); the reduction of power in one or both of the engines might be during cruise only, during cruise and initial descent, during final descent, or at any other time. The centerline thrust characteristics of a pair of jet engines, one or both of which may be main engines, creates room for developing unequal applications of thrust in order to achieve whatever level of higher performance (both engines operating), economy (one engine off, or one or both engines on reduced power), safety (both engines operating, though perhaps with one at reduced power—in addition to the inherent safety margin already provided in an engine-out emergency by a pair of engines having symmetrical, centerline thrust) or other advantage desired. Indeed, there are advantages to be gained even if the only staging or reduction in power occurs during taxi.

Figure 3:
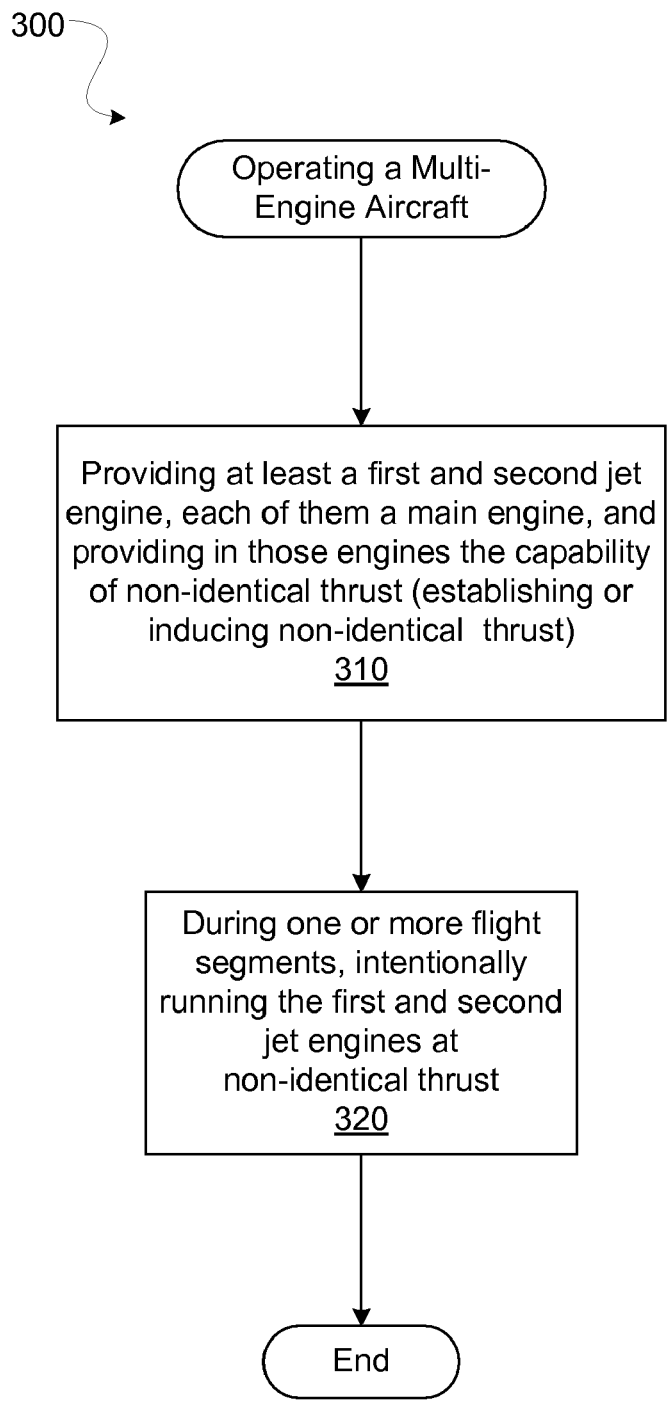
FIG. 3 is a high-level flow diagram illustrating operation of a multi-engine aircraft according to one embodiment of the present invention.

One embodiment of a method for operating a multi-engine aircraft 300 is described in FIG. 3. In this embodiment, a first and second jet engine, where each engine is a main engine, capable of non-identical thrust are provided, block 310. During one or more flight segments, the first and second jet engines are intentionally operated at non-identical thrust, block 320. Non-identical thrust may be created while both engines are operating or by staging an engine.

Figure 4:
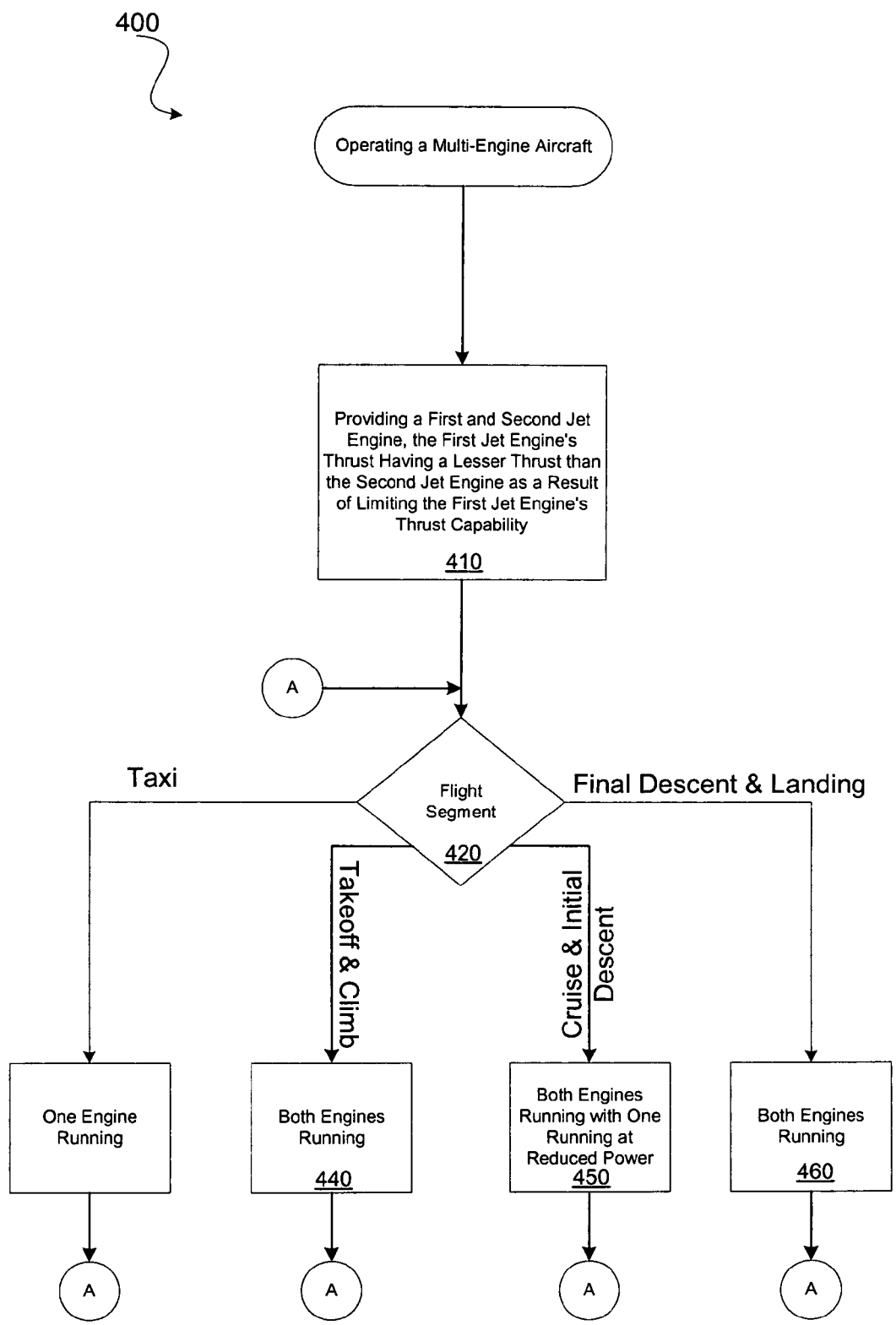
FIG. 4 is a flow diagram illustrating a process of determining engine activity at various points during a flight plan according to one embodiment of the present invention.

In FIG. 4, a method 400 of operating a multi-engine aircraft begins at block 410 where a first and second jet engine are provided. According to the present example, the first jet engine has a lesser thrust than the second jet engine as a result of limiting the first jet engine's thrust capability. A determination is made at 420 as to the current flight segment of the aircraft. In the present example, if the aircraft is in the taxi flight segment, one engine is running as indicated by block 430. The other engine may be running at a reduced power or may be off.

If the aircraft is in the takeoff and climb fight segment, both of the engines are operating as indicated by block 440. In block 450, both engines are running with one of the engines running at a reduced power during the cruise and initial descent flight segment. Alternatively, both engines may be running at full power or one engine may be running at full power and the other may be off.

If the determination at block 420 is made that the aircraft is in the final descent and landing segment of the flight, to the extent either engine was previously running at reduced power or off, the power of such engine is increased or such engine is restarted thereby causing both engines to be running as indicated by block 460.

(d.) Particular Applications.

The methods described herein can be used with any number of products, and may be adapted to a wide range of applications. Among the specific products appropriate for this concept are:

a 19 passenger commuter. It should be noted that the design of this product is intended to bridge the gap that presently exists between conventional turbo-prop aircraft in this category and a jet engine implementation.

a utility jet. It should be noted that the design of this product is intended to bridge the gap that presently exists between conventional turbo-prop aircraft in this category and a jet engine implementation.

a fractional ownership aircraft. It should be noted that the prior patents provide for staging, and the instant disclosure contemplates reductions in power in a non-staged profile.

a relatively small, e.g., about 8,000 lb. gross take off weight, or price target in the range of about $1.0 to $2.5 million personal/business jet. It should be noted that the design of this product is intended to bridge the gap that presently exists between conventional single engine aircraft in this category and a multiple jet engine implementation, as well as the gap between turbo-prop and jet engine implementations.

(e.) Design Methods.

As may be readily understood from the forgoing disclosures, embodiments of the present invention permit and encourage a new method of aircraft design. Rather than taking the necessity of identical engines 120, 140 as a given in any paired engine design, the freedom to create numerous combinations of differential thrust conditions (and then further to vary the thrust during operation of the aircraft) allows the designer the flexibility to solve problems and/or to maximize results in a new way. For example, the designer can target a particular product or niche (i.e., the 19 passenger commuter, the utility jet, the fractional ownership market, the small jet, or any other particular product); the designer can target any one or more of the typical criteria (acquisition cost, operational cost, speed, range/loiter, balanced field length, cabin volume, weight); and the designer can create the product which fulfills the need (that is, a concern with balanced field length might drive the size of the smaller engine; a concern with cruise speed might drive the size of the larger engine). Given an existing operating aircraft, the concepts described herein might permit a relatively rapid retrofit to enhance performance. Given a clean slate, the concepts described herein permit the designer rapidly to attain a concept-level design.

Advantages

By not requiring staging, various methods described herein can avoid staging issues—that is, issues over whether an engine intentionally shut down during flight can be restarted "cold" when needed (and, therefore, it should not be necessary to obtain regulatory approvals, to obtain certifications or otherwise to satisfy the concern over whether an engine 120, 140, once shut down during flight can be reliably counted upon to restart when needed). As understood from the foregoing discussion and as illustrated in the foregoing operational table, Table 1, both engines can be kept running during flight, with one of them on reduced power.

Even without staging during flight, it is anticipated that the operational methods contemplated herein can still reduce operating costs. The applicant has estimated that the staged method of the prior patents might result in about a 30% savings in operating costs. The applicant is estimating that the non-staged method (that is, no staging during flight, but with staging on taxi and reduced power in flight) discussed above can still yield about a 20% savings in operating costs.

The methods described above continue to preserve the safety of centerline thrust in an emergency engine-out condition (because of the symmetrical thrust) as compared to the emergency engine-out condition in a conventional twin (with asymmetrical thrust).

In conclusion, embodiments of the present invention provide novel systems, methods and arrangements for using imbalanced thrust in a multi-engine jet aircraft. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method of operating a multi-engine aircraft comprising:
  (a.) providing a first jet engine having a thrust adequate to takeoff, climb, cruise, and land the aircraft at full gross weight, and providing a second jet engine having a thrust greater than the thrust of the first jet engine as a result of limiting the first jet engine's maximum thrust capability, but otherwise being equally powered, each of the first and second jet engines is a main engine, and the first jet engine and the second jet engine are mounted to an airframe and intersected by a plane vertical to a centerline along the longitudinal axis of the airframe;
  (b.) during take-off and climb, running the first jet engine and running the second jet engine; and
  (c.) during ordinary operational cruise, running one of the first jet engine and second jet engine and reducing the power of the other jet engine while keeping it running.

2. A method of operating a multi-engine aircraft comprising:
  (a.) providing a first jet engine and a second jet engine, the second jet engine having a thrust lesser than the thrust of the first jet engine as a result of limiting the second jet engine's maximum thrust capability, but otherwise being equally powered, the first jet engine and the second jet engine are mounted to an airframe and intersected by a plane vertical to a centerline along the longitudinal axis of the airframe;
  (b.) running both of the first jet engine and the second jet engine during take-off and climb; and
  (c.) creating a thrust differential between the first jet engine and the second jet engine during one or more flight segments by continuing to run both of the first jet engine and the second jet engine, but running one of the first jet engine or the second jet engine at a reduced power.

3. The method of claim 2, wherein one of the one or more flight segments comprises ordinary operational cruise.

4. The method of claim 3, wherein each of the first jet engine and the second jet engine comprise a main jet engine, thereby each having a thrust adequate to takeoff, climb, cruise and land the jet aircraft at full gross weight without use of the other jet engine.

5. A method of operating a multi-engine aircraft comprising:
  (a.) providing a first jet engine and a second jet engine, the second jet engine having a thrust lesser than the thrust of the first jet engine as a result of limiting the second jet engine's maximum thrust capability, but otherwise being equally powered, wherein the first jet engine and the second jet engine are mounted to an airframe and intersected by a plane vertical to a centerline along the longitudinal axis of the airframe;
  (b.) running both of the first jet engine and the second jet engine during a first set of one or more flight segments; and
  (c.) creating a thrust differential between the first jet engine and the second jet engine during a second set of one or more flight segments by continuing to run both of the first jet engine and the second jet engine, but running at least one of the first jet engine and the second jet engine at a reduced power as compared to that employed during the first set of one or more flight segments.

6. The method of claim 5, wherein the first set of one or more flight segments includes taxi.

7. The method of claim 5, wherein the first set of one or more flight segments includes takeoff.

8. The method of claim 5, wherein the first set of one or more flight segments includes climb.

9. The method of claim 5, wherein the first set of one or more flight segments includes ordinary operational cruise.

10. The method of claim 5, wherein the first set of one or more flight segments includes initial descent.

11. The method of claim 5, wherein the first set of one or more flight segments includes final descent.

12. The method of claim 5, wherein the first set of one or more flight segments includes landing.

13. The method of claim 5, wherein the second set of one or more flight segments includes taxi.

14. The method of claim 5, wherein the second set of one or more flight segments includes takeoff.

15. The method of claim 5, wherein the second set of one or more flight segments includes climb.

16. The method of claim 5, wherein the second set of one or more flight segments includes ordinary operational cruise.

17. The method of claim 5, wherein the second set of one or more flight segments includes initial descent.

18. The method of claim 5, wherein the second set of one or more flight segments includes final descent.

19. The method of claim 5, wherein the second set of one or more flight segments includes landing.

20. The method of claim 5, further comprising staging one of the first jet engine or the second jet engine during one or more flight segments.

21. The method of claim 5, wherein each of the first jet engine and the second jet engine comprises a main jet engine.

22. A method of operating a multi-engine aircraft comprising:
- (a) providing a first jet engine and a second jet engine, the second jet engine having a thrust greater than the thrust of the first jet engine as a result of limiting the first jet engine's maximum thrust capability, but otherwise being equally powered, wherein the first jet engine and the second jet engine are mounted to an airframe and intersected by a plane vertical to a centerline along the longitudinal axis of the airframe;
- (b) during take-off and climb, running both the first jet engine and the second jet engine;
- (c) during ordinary operational cruise, keeping both the first jet engine and the second jet engine running and reducing the power of one of the first jet engine and the second jet engine.

* * * * *